United States Patent
Sakurai et al.

(10) Patent No.: US 11,379,812 B2
(45) Date of Patent: Jul. 5, 2022

(54) DATA MANAGEMENT DEVICE, DATA MANAGEMENT SYSTEM, AND DATA MANAGEMENT METHOD

(71) Applicant: TOSHIBA TEC KABUSHIKI KAISHA, Tokyo (JP)

(72) Inventors: Kenji Sakurai, Mishima Shizuoka (JP); Kazuya Nambu, Nakano Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/905,848

(22) Filed: Jun. 18, 2020

(65) Prior Publication Data
US 2021/0073764 A1 Mar. 11, 2021

(30) Foreign Application Priority Data
Sep. 10, 2019 (JP) .............................. JP2019-164754

(51) Int. Cl.
*G06Q 20/20* (2012.01)
(52) U.S. Cl.
CPC ......... *G06Q 20/202* (2013.01); *G06Q 20/206* (2013.01); *G06Q 20/209* (2013.01)
(58) Field of Classification Search
CPC ... G06Q 20/202; G06Q 20/206; G06Q 20/209
See application file for complete search history.

(56) References Cited

U.S. PATENT DOCUMENTS

| | | | | |
|---|---|---|---|---|
| 2005/0049928 | A1* | 3/2005 | Naick | G06Q 30/06 705/30 |
| 2005/0102158 | A1* | 5/2005 | Maeda | G16H 10/20 705/2 |
| 2007/0276880 | A1* | 11/2007 | Lu | G06Q 30/0214 707/999.203 |
| 2015/0356689 | A1* | 12/2015 | Gotanda | G06Q 20/047 705/30 |

* cited by examiner

*Primary Examiner* — A. Hunter Wilder
*Assistant Examiner* — Joseph M Mutschler
(74) *Attorney, Agent, or Firm* — Kim & Stewart LLP

(57) ABSTRACT

A data management device includes a network interface, a memory storing first and second databases, and a processor. The processor determines whether a customer identifier has been included in receipt data. When the identifier is included, the receipt data is stored in both databases. When the identifier is not included, receipt data is stored in the second database. The processor searches the first database for receipt data including a customer's identifier upon request and controls the interface to transmit the receipt data found by the search to the customer terminal. If a search request is received from a server, the second database is searched for receipt data that satisfies a search condition accompanying the request, and then receipt found in the search is transmitted to the server.

14 Claims, 10 Drawing Sheets

DATA MANAGEMENT DEVICE, DATA MANAGEMENT SYSTEM, AND DATA MANAGEMENT METHOD

CROSS-REFERENCE TO RELATED APPLICATION

This application is based upon and claims the benefit of priority from Japanese Patent Application No. 2019-164754, filed Sep. 10, 2019, the entire contents of which are incorporated herein by reference.

FIELD

Embodiments described herein relate generally to a data management device, a data management system, and a data management method.

BACKGROUND

A company that operates a shopping center, such as a developer, signs a lease agreement with each of the several tenant stores and makes profits mainly from collection of rent. For this reason, developers prefer to keep track of the total sales by each tenant store to set rents to reflect the total sales by each store. However, recently, due to intensified competition and sluggish sales, there is also a demand for developers to analyze the sales of individual commodities for each tenant store.

Such an analysis can be achieved by, for example, obtaining data on each sales receipt issued by each tenant during the course of business. However, POS (Point of Sales) systems used by tenant stores are typically independent of each other. Moreover, store servers or POS terminals included in the various POS systems are often manufactured by different manufacturers. For these reasons, it has been difficult to obtain and manage receipt data being issued by several different stores.

DETAILED DESCRIPTION

In general, according to one embodiment, a data management device comprises a network interface, a memory that stores first and second databases for storing receipt data, and a processor. The processor is configured to, upon receipt of receipt data via the network interface, determine whether a customer identifier of a customer is included in the receipt data. Upon determining that the customer identifier is included in the receipt data, the processor stores the receipt data in the first and second databases. Upon determining that the customer identifier is not included in the receipt data, the processor stores the receipt data in the second database. The processor is further configured to search the first database for receipt data including an identifier of a customer upon receipt of a request for receipt data from a customer terminal used by the customer. The processor controls the network interface to transmit the receipt data found by the search to the customer terminal. The processor is also configured to search the second database for receipt data that satisfies a search condition if a request for receipt data is received from a first center server. The processor controls the network interface to transmit the receipt data found by the search to the first center server.

Hereinafter, embodiments of a data management system and a data management device of the system, capable of easily managing receipt data issued at a plurality of stores will be described with reference to the drawings.

The embodiments described below exemplifies a data management system in which a developer of one shopping center can easily manage receipt data issued by a plurality of stores operating in the shopping center as tenants.

First Embodiment

Figure 1:
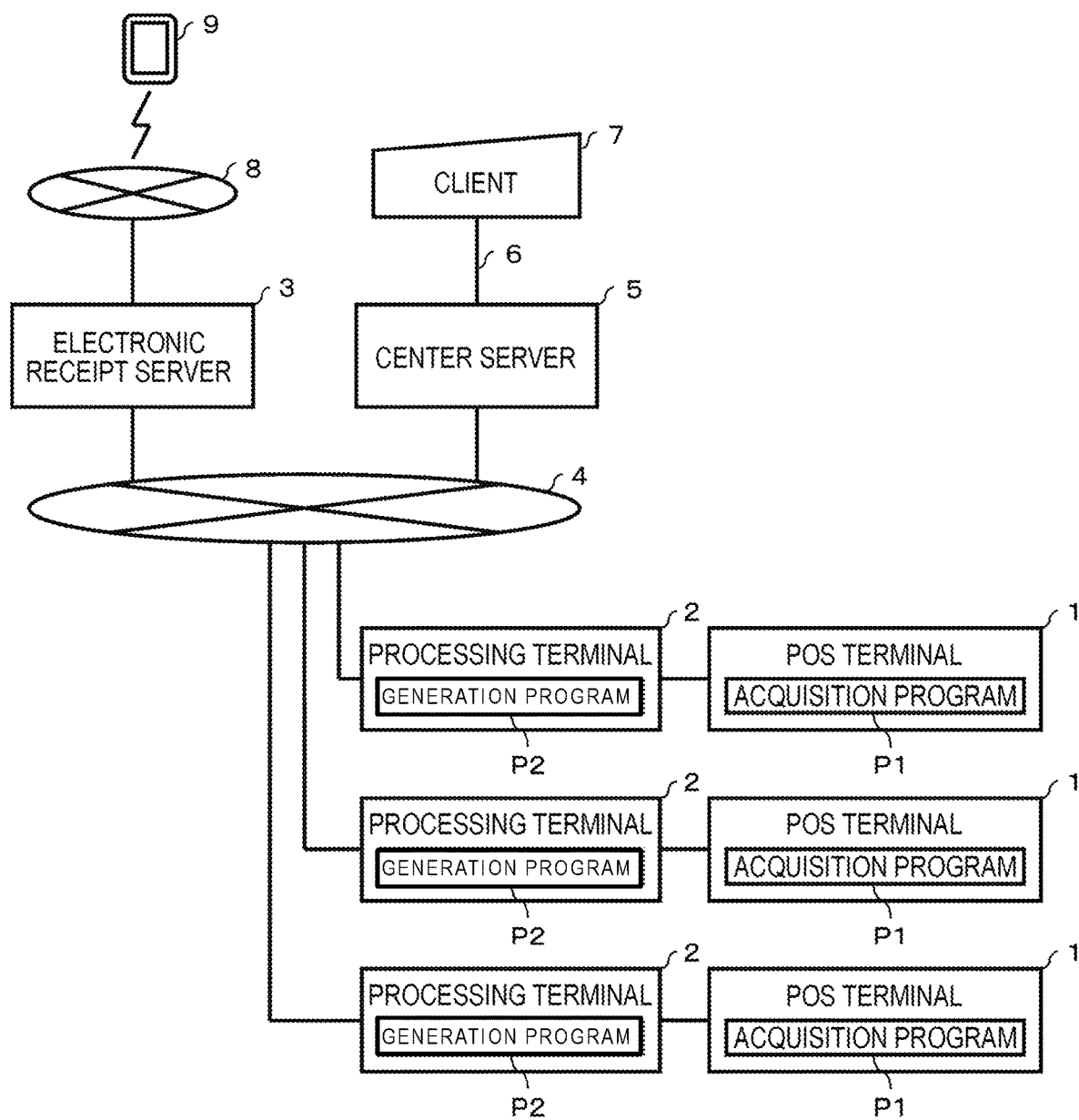
FIG. 1 depicts aspects of a data management system according to a first embodiment.

FIG. 1 is a configuration diagram of an entire system including a data management system according to a first embodiment. The data management system includes a plurality of processing terminals 2 respectively connected to a plurality of POS terminals 1, an electronic receipt server 3, and a communication network 4. The communication network 4 is, for example, an Internet VPN (Virtual Private Network). The communication network 4 is connected to a center server in addition to the processing terminal 2 and the electronic receipt server 3. The center server 5 is a computer managed by the developer of the shopping center. A client terminal 7 is connected to the center server 5 via a communication line 6. The electronic receipt server 3 and the center server 5 may be a server installed in a cloud computing system.

The POS terminal 1 and the processing terminal 2 are installed in each store operating in the shopping center as a tenant. The POS terminal 1 and the processing terminal 2 are connected by a communication line conforming to, for example, the RS232C interface standard. The communication line may be wired or wireless. Any number of POS terminals 1 may be installed in each store. Further, any number of processing terminals 2 may be installed in each store. The POS terminal 1 and the processing terminal 2 do not necessarily have to correspond one-to-one. A plurality of POS terminals 1 may be connected to one processing terminal 2. It is sufficient that the processing terminal 2 is connected to the POS terminal 1 at least.

An acquisition program P1 is installed in each POS terminal 1. The acquisition program P1 is an agent program for acquiring print data of a receipt created by the POS terminal 1 and outputting the print data to the processing terminal 2. The POS terminal 1 has a printer for printing a receipt. The POS terminal 1 issues a paper receipt by printing the print data of the receipt with a printer. On the paper receipt, a transaction date and time, a transaction number, a cash register number, and the like are printed, along with a commodity name, a price, a total amount, and the like of each of one or more commodities registered in one transaction.

A generation program P2 is installed in each processing terminal 2. The generation program P2 is a program for generating electronic receipt data in the structured format from receipt print data in the unstructured format received from the POS terminal 1. Any known technique may be used for generating the electronic receipt data from the receipt print data.

Figure 2:
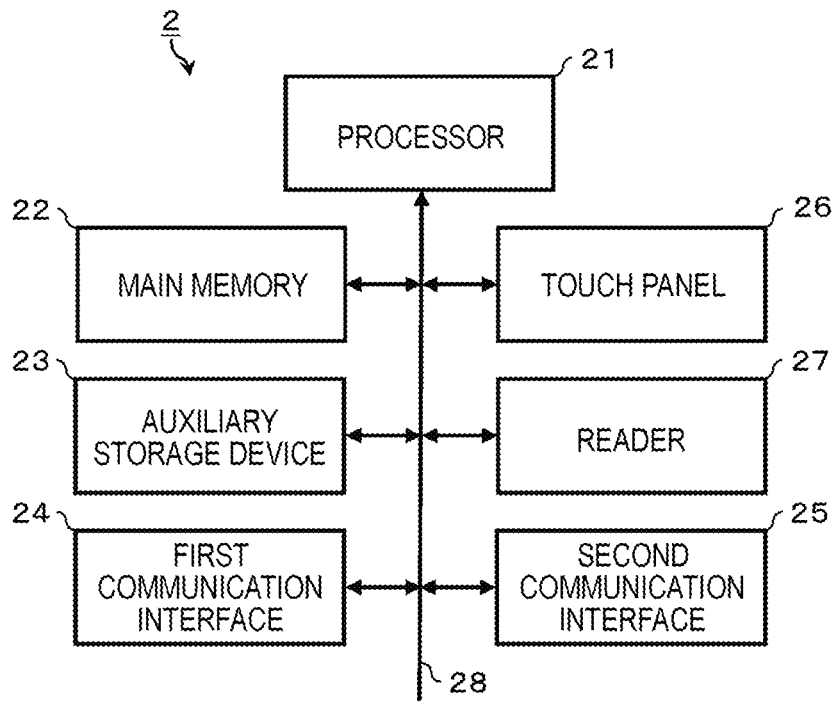
FIG. 2 is a block diagram of a processing terminal included in a data management system.

FIG. 2 is a block diagram of the processing terminal 2. The processing terminal 2 includes a processor 21, a main memory 22, an auxiliary storage device 23, a first communication interface 24, a second communication interface 25, a touch panel 26, a reader 27, and a system transmission path 28. The system transmission path 28 may be an address bus, a data bus, a control signal line, or the like. The processor 21, the main memory 22, the auxiliary storage device 23, the first communication interface 24, the second communication interface 25, the touch panel 26, and the reader 27 are connected to each other via the system transmission path 28.

The processor 21 controls each unit of the processing terminal 2 to perform various functions as the processing terminal 2 in accordance with an operating system or an application program. The processor 21 is, for example, a CPU (Central Processing Unit).

The main memory 22 includes a non-volatile memory area and a volatile memory area. The non-volatile memory area of the main memory 22 stores an operating system or an application program. The non-volatile or volatile memory areas of the main memory 22 may store data required for the processor 21 to execute processing for controlling each unit. The volatile memory area is used as a work area in which data is rewritten by the processor 21. The nonvolatile memory area is, for example, a ROM (Read Only Memory). The volatile memory area is, for example, a RAM (Random Access Memory).

The auxiliary storage device 23 is, for example, an EEPROM (Electric Erasable Programmable Read-Only Memory), an HDD (Hard Disc Drive), or an SSD (Solid State Drive). The auxiliary storage device 23 stores data used by the processor 21 to perform various processes, data generated by the process performed by the processor 21, and the like. The auxiliary storage device 23 may store the application program described above.

The application program stored in the main memory 22 or the auxiliary storage device 23 includes a control program executed by the processing terminal 2. The control program also includes the generation program P2 described above. Any method for installing the control program including the generation program P2 in the main memory 22 or the auxiliary storage device 23 may be used. The control program can be installed in the main memory 22 or the auxiliary storage device 23 via a removable recording medium or a network. Any type of recording medium may be used as long as the recording medium can store a program, such as a CD-ROM or a memory card.

The first communication interface 24 communicates data with the POS terminal 1. The data communication may be performed, for example, via a wired LAN (Local Area Network) or may be performed via a wireless LAN.

The second communication interface 25 communicates data with the electronic receipt server 3 via the communication network 4. The second communication interface 25 may communicate data with the center server 5 via the communication network 4.

The touch panel 26 is a device that functions as an input device and a display device of the processing terminal 2. The reader 27 is a device for reading data recorded on a medium. For example, the reader 27 is an IC card reader capable of reading data from an IC card. The reader 27 may be a magnetic card reader capable of reading data from a magnetic card. The reader 27 may be an RFID (Radio Frequency Identification) reader capable of reading data from an RFID tag.

Return to the description of FIG. 1. The electronic receipt server 3 is a computer managed by a company that provides an electronic receipt service. The company is a separate entity from the developer of the shopping center. The company may be operated by the developer of the shopping center.

The electronic receipt server 3 collects electronic receipt data generated by each processing terminal 2 via the communication network 4 and stores the data in a database. Further, the electronic receipt server 3 accepts access from an information terminal 9 connected via the Internet 8, acquires requested electronic receipt data from the database, and transmits the electronic receipt data to the information terminal 9. The electronic receipt server functions as a data management device of the data management system.

The information terminal 9 is an electronic device owned by a consumer who is registered as a member to receive an electronic receipt service. An application program necessary for receiving an electronic receipt service, a so-called electronic receipt application is installed in the information terminal 9. By installing the electronic receipt application on the information terminal 9, a unique electronic receipt ID is set for the information terminal 9. When the electronic receipt application is activated on the information terminal 9 to which the electronic receipt ID is set, a barcode indicating the electronic receipt ID is displayed on the display of the information terminal 9. The information terminal 9 is typically a smartphone. The information terminal 9 may be a tablet terminal, a notebook computer, or the like.

Figure 3:
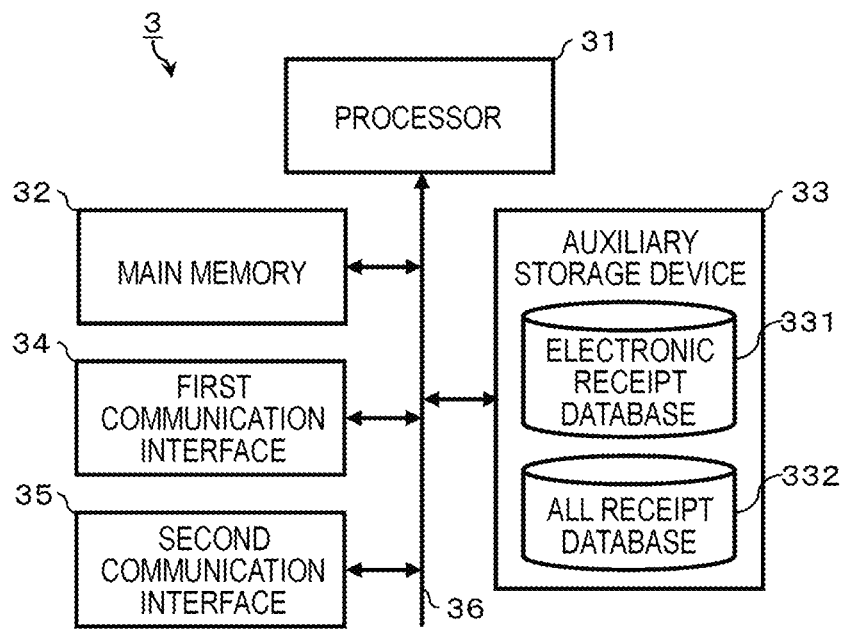
FIG. 3 is a block diagram of an electronic receipt server included in a data management system.

FIG. 3 is a block diagram of the electronic receipt server 3. The electronic receipt server 3 includes a processor 31, a main memory 32, an auxiliary storage device 33, a first communication interface 34, a second communication interface 35, and a system transmission path 36. The system transmission path 36 may be an address bus, a data bus, a control signal line, or the like. The processor 31, the main memory 32, the auxiliary storage device 33, the first communication interface 34, and the second communication interface 35 are connected to each other via the system transmission path 36.

The processor 31 controls each unit of the electronic receipt server 3 to perform various functions as the electronic receipt server 3 according to an operating system or an application program. The processor 31 is, for example, a CPU.

The main memory 32 includes a non-volatile memory area and a volatile memory area. The non-volatile memory area of the main memory 32 stores an operating system or an application program. The non-volatile or volatile memory areas of the main memory 32 may store data required for the processor 31 to execute processing for controlling each unit. The volatile memory area is used as a work area in which data is rewritten by the processor 31. The nonvolatile memory area is, for example, a ROM. The volatile memory area is, for example, a RAM.

The auxiliary storage device 33 is, for example, an auxiliary storage device 33 may be an EEPROM, an HDD, or an SSD. The auxiliary storage device 33 stores data used when the processor 31 performs various processes, data generated by the process performed by the processor 31, and the like. The auxiliary storage device 33 may store the application program described above.

The application program stored in the main memory 32 or the auxiliary storage device 33 includes a control program executed by the electronic receipt server 3. The control program also includes a data management program described later. Any method for installing the control program including the data management program in the main memory 32 or the auxiliary storage device 33 may be used. The control program can be installed in the main memory 32 or the auxiliary storage device 33 via a removable recording medium or a network. Any type of recording medium may be used as long as the recording medium can store a program, such as a CD-ROM or a memory card.

The first communication interface 34 communicates data with the information terminal 9 connected via the Internet 8.

The second communication interface 35 communicates data with each processing terminal 2 via the communication network 4.

The electronic receipt server 3 stores an electronic receipt database 331 and an "all receipt" database 332 in the auxiliary storage device 33. The electronic receipt database 331 is a database accumulating electronic receipt data for which receipt information about transactions settled by an electronic receipt member is recorded. The all receipt database 332 is a database accumulating electronic receipt data for which receipt information about transactions settled by all consumers whether the electronic receipt members or non-members is recorded.

Figure 4:
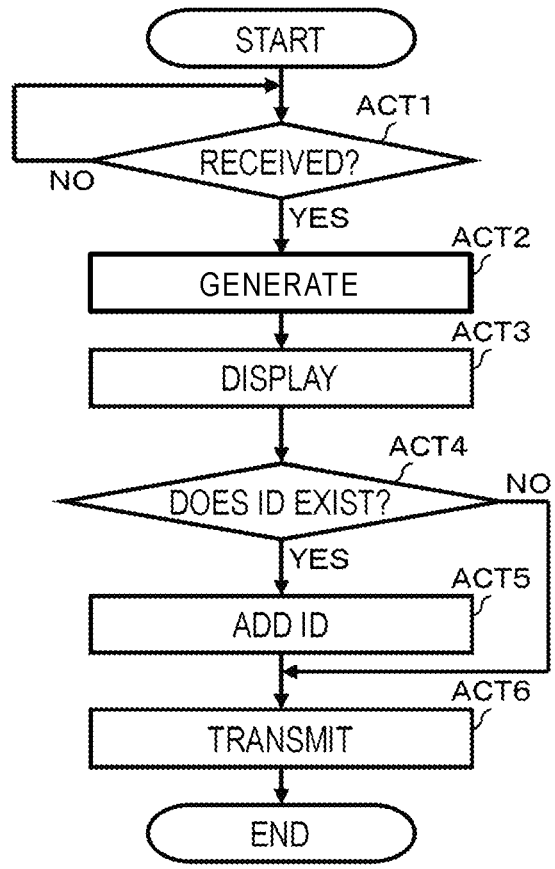
FIG. 4 is a flowchart of a main information process executed by the processing terminal.
Figure 5:
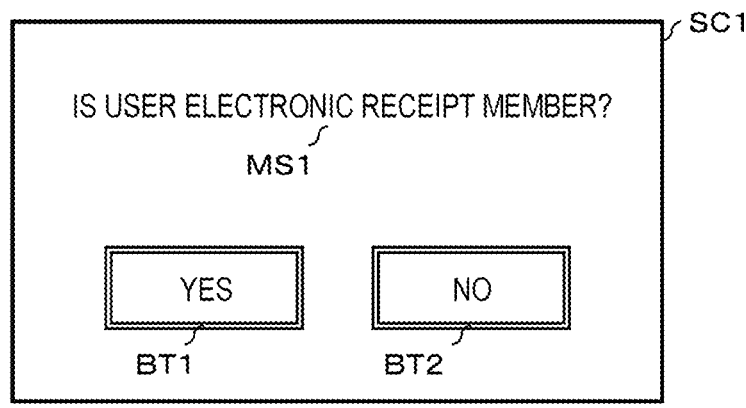
FIG. 5 is a diagram showing an example of a screen displayed on a touch panel of the processing terminal.
Figure 6:
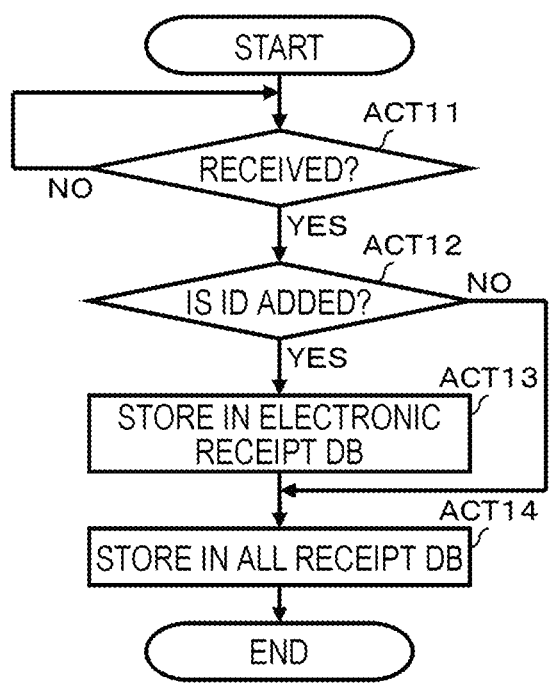
FIG. 6 is a flowchart of an electronic receipt data receiving process executed by an electronic receipt server.
Figure 7:
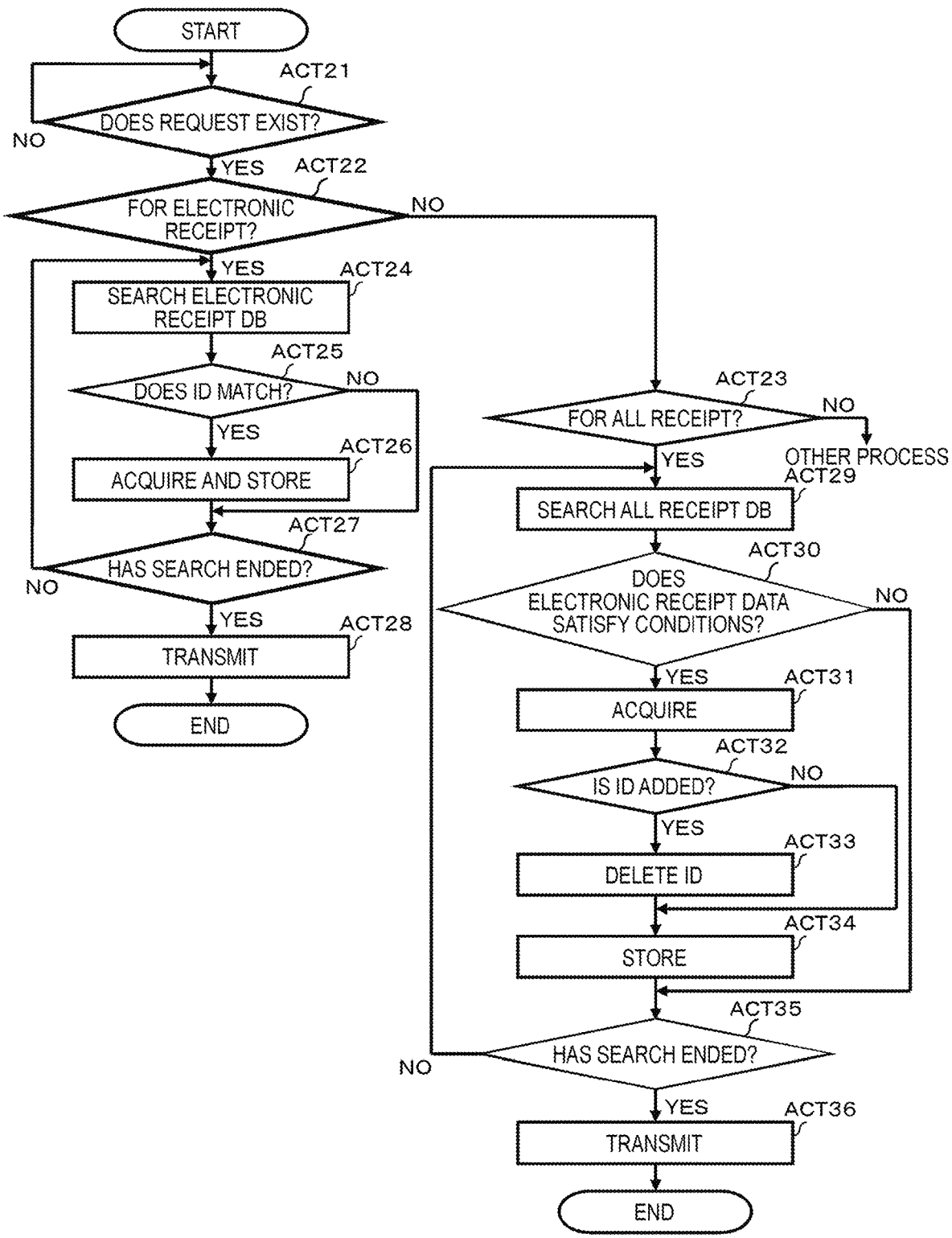
FIG. 7 is a flowchart of a request command receiving process executed by an electronic receipt server.

FIG. 4 is a flowchart showing a main information process executed by the processor 21 of the processing terminal 2. FIG. 5 is an example of a screen SC1 displayed on the touch panel 26 of the processing terminal 2. FIG. 6 is a flowchart of a receipt data receiving process executed by the processor 31 of the electronic receipt server 3. FIG. 7 is a flowchart of a request command receiving process executed by the processor 31. Hereinafter, the operation of the data processing system will be described with reference to the drawings. The operation described below is a non-limiting example. As long as a similar result can be achieved, any of several different operations may be executed.

As shown in FIG. 4, the processor 21 is waiting for receipt print data from the POS terminal 1, as ACT1. In the POS terminal 1, when one consumer performs settlement of a transaction, print data of a receipt including information on a commodity purchased in the transaction is generated. Then, the receipt print data is transmitted to the processing terminal 2 via the communication line according to the acquisition program P1.

Upon receipt of the receipt print data from the POS terminal 1 via the first communication interface 24, the processor 21 determines YES in ACT1 and proceeds to ACT2. The processor 21 converts the receipt print data in the unstructured format into electronic receipt data in the structured format according to the generation program P2, as ACT2. Further, the processor 21 causes the touch panel 26 to display the screen SC1 shown in FIG. 5, as ACT3. The screen SC1 displays an affirmative "Yes" button BT1 and a negative "No" button BT2, together with a message MS1 for inquiring whether or not the user is an electronic receipt member.

An operator touches the "No" button BT2 if the present consumer is not an electronic receipt member or the "Yes" button BT1 if the present customer is an electronic receipt member. In this context, an "electronic receipt member" is a customer who has joined (or otherwise been signed up to participate in) an electronic receipt program by which the customer receives sales transaction receipts via email, online, or the like. If the customer is an electronic receipt member, the operator causes the reader 27 to read a barcode representation of the electronic receipt program member ID displayed on the display of the information terminal 9 owned by the consumer.

The operator is typically a cashier who operates the POS terminal 1 to settle a transaction with a customer. The operator may be a store clerk other than the cashier, or the customer himself or herself if the POS terminal 1 is a self-service POS terminal.

When the screen SC1 is displayed on the touch panel 26, the processor 21 checks whether or not the member ID of the electronic receipt member is input, as ACT4. When the member ID is read via the reader 27, the processor 21 determines YES in ACT4, and proceeds to ACT5. The processor 21 adds the member ID to the electronic receipt data created in the process of ACT2, as ACT5. Then, the processor 21 proceeds to the process of ACT6. On the other hand, if the signal from the touch panel 26 confirms that the "No" button BT2 is touched, the processor 21 determines NO in ACT4, skips the process of ACT5, and proceeds to ACT6.

The processor 21 controls the second communication interface 25 to transmit electronic receipt data to the electronic receipt server 3, as ACT6. With this control, the electronic receipt data is transmitted to the electronic receipt server 3 via the communication network 4. Therefore, when the "Yes" button BT1 on the screen SC1 is touched and the member ID is read by the reader 27, the electronic receipt data to which the member ID has been added is transmitted to the electronic receipt server 3. When the "No" button BT2 on the screen SC1 is touched, electronic receipt data for which no member ID has been added is transmitted to the electronic receipt server 3.

Here, the processor 21 of the processing terminal 2 executes the process of ACT2 for generating electronic receipt data. In addition, the processor 21 acquires a member ID by executing the processes of ACT3 and ACT4 in cooperation with the touch panel 26. Further, the processor 21 executes the processes of ACT5 and ACT6 in cooperation with the second communication interface 25. That is, if a member ID is acquired, the processor 21 adds the member ID to the electronic receipt data and controls the second communication interface 25 to transmit the amended electronic receipt data to the electronic receipt server 3. If the member ID is not acquired, the processor 21 controls the second communication interface 25 to transmit the electronic receipt data to the electronic receipt server 3 without adding the member ID.

As shown in FIG. 6, the processor 31 waits for the electronic receipt data, as ACT11. When the electronic receipt data transmitted from one of the processing terminals 2 is received via the second communication interface 35, the processor 31 determines YES in ACT11 and proceeds to ACT12. The processor 31 checks whether or not a member ID was added to the electronic receipt data, as ACT12. If a member ID was added, the processor 31 determines YES in ACT12 and proceeds to ACT13. The processor 31 stores the electronic receipt data to which a member ID was added in the electronic receipt database 331, as ACT13. Thereafter, the processor 31 proceeds to ACT14.

On the other hand, if a member ID was not added to the electronic receipt data, the processor 31 determines NO in ACT12 and thus skips the process of ACT13. That is, the processor 31 does not store the electronic receipt data for which no member ID was added in the electronic receipt database 331. The processor 31 proceeds to ACT14.

The processor 31 stores both the electronic receipt data to which the member ID was added and the electronic receipt data to which no member ID was added in the all receipt database 332, as ACT14. As described above, the processor 31 ends the information processing when the electronic receipt data is stored.

Here, the processor 31 of the electronic receipt server 3 executes the procedure shown in the flowchart of FIG. 6 according to the data management program. That is, when a member ID is added to the electronic receipt data received by the second communication interface 35, the processor 31 stores the electronic receipt data in the all receipt database 332 and the electronic receipt database 331. If a member ID is not added, the processor 31 stores the electronic receipt data in the all receipt database 332 but does not store the electronic receipt data in the electronic receipt database 331.

As shown in FIG. 7, the processor 31 is waiting for a data request command from the information terminal 9 or the center server 5, as ACT21. The data request command is either an electronic receipt request command output from an information terminal 9 or an all receipt request command output from the center server 5. An electronic receipt request command includes the member ID set in the information terminal 9 that has transmitted the command. The all receipt request command includes, for example, condition data that is input via the client terminal 7. The condition data is, for example, data for individually specifying stores that are tenants of a particular mall or retail site. The condition data is, for example, data for collectively specifying all stores of interest or relevance.

When the data request command is received, the processor 31 determines YES in ACT21 and proceeds to ACT22. The processor 31 checks whether the received command is an electronic receipt request command, as ACT22. If the command is not an electronic receipt request command, the processor 31 determines NO in ACT22 and proceeds to ACT23. The processor 31 checks whether the received command is an all receipt request command, as ACT23. If the received command is not an all receipt request command, either, the processor 31 determines NO in ACT23 and executes a process based on another request command ("other process").

When the electronic receipt request command is received from the information terminal 9 via the first communication interface 34, the processor 31 determines YES in ACT22 and proceeds to ACT24. The processor 31 searches the electronic receipt database 331, as ACT24. Then, the processor 31 checks whether a member ID added to the electronic receipt data stored in the electronic receipt database 331 matches the member ID included in the electronic receipt request command, as ACT25.

If member IDs do not match, the processor 31 determines NO in ACT25, skips the process of ACT26, and proceeds to ACT27. The processor 31 checks whether the search of the electronic receipt database 331 has ended, as ACT27. If the search has not ended, the processor 31 determines NO in ACT27 and returns to ACT24. That is, the processor 31 continues to search the electronic receipt database 331.

If the electronic receipt data with a member ID matching the member ID included in the electronic receipt request command is detected as a result of searching the electronic receipt database 331, the processor 31 determines YES in ACT25 and proceeds to ACT26. As ACT26, the processor 31 acquires the electronic receipt data having the matching member ID from the electronic receipt database 331, and stores this data in a volatile area of the main memory 32, for example.

After storing the electronic receipt data with the matching member ID, the processor 31 checks whether the search of the electronic receipt database 331 has ended, as ACT27. If the search has not ended, the processor 31 returns to ACT24 and continues to search the electronic receipt database 331.

As described above, the processor 31 that received the electronic receipt request command searches the electronic receipt database 331. Each time the processor 31 finds electronic receipt data for the member ID included in the electronic receipt request command, the found electronic receipt data is stored in the main memory 32. Then, when the search of the electronic receipt database 331 is ended, the processor 31 determines YES in ACT27 and proceeds to ACT28. The processor 31 controls the first communication interface 34 to transmit all the electronic receipt data stored in the main memory 32 to the information terminal 9 that sent the electronic receipt request command, as ACT28. With this control, the electronic receipt data is transmitted from the first communication interface 34 to the information terminal 9 via the Internet 8 or the like. That is, the electronic receipt data for the member ID set in the information terminal 9 is transmitted to the information terminal 9 that sent the electronic receipt request command. Thus, since the information terminal 9 can display the digitized sales receipt on the display, a consumer that is an electronic receipt member can receive the information concerning the transaction performed in the store as an electronic receipt.

On the other hand, if an all receipt request command is received from the center server 5 via the second communication interface 35, the processor 31 determines YES in ACT23 and proceeds to ACT29. The processor 31 searches the all receipt database 332, as ACT29. Then, the processor 31 checks whether or not the electronic receipt data stored in the all receipt database 332 satisfies the condition data included in the all receipt request command, as ACT30.

For example, when the condition data is data for individually specifying a store, the processor 31 searches for electronic receipt data of a receipt issued by that one store. Since the electronic receipt data includes store identification information for identifying the store, the processor 31 determines whether or not the condition is satisfied based on the store identification information.

For example, if the condition data is data specifying all stores, the processor 31 searches for electronic receipt data for receipts issued by any of the stores.

If the condition is not satisfied, the processor 31 determines NO in ACT30, skips the process of ACT31 to ACT34, and proceeds to ACT35. The processor 31 checks whether or not the search of the all receipt database 332 has ended, as ACT35. If the search has not ended, the processor 31 determines NO as ACT35 and returns to ACT29. That is, the processor 31 continues to search the all receipt database 332.

When electronic receipt data satisfying the condition data included in the all receipt request command is detected in searching the all receipt database 332, the processor 31 determines YES in ACT30 and proceeds to ACT31.

The processor 31 acquires the electronic receipt data from the electronic receipt database 331, as ACT31. Then, the processor 31 checks whether or not a member ID was added to the electronic receipt data, as ACT32. If a member ID was added to the electronic receipt data, the processor 31 determines YES in ACT32 and proceeds to ACT33. The processor 31 deletes the member ID from the electronic receipt data, as ACT33. Then, the processor 31 stores the electronic receipt data for which the member ID has been deleted in the main memory 32, as ACT34.

On the other hand, if a member ID was not added to the electronic receipt data, the processor 31 determines NO in ACT32, skips the process of ACT33, and proceeds to ACT34. That is, the processor 31 stores the electronic receipt data acquired from the all receipt database 332 in the main memory 32.

Thereafter, the processor 31 checks whether or not the search of the all receipt database 332 has ended, as ACT35. If the search has not ended, the processor 31 continues to search the all receipt database 332.

As described above, upon receipt of the all receipt request command the processor 31 searches the all receipt database 332. Each time the processor 31 detects electronic receipt data that satisfies the condition data included in all the receipt request commands, the processor 31 stores the electronic receipt data in the main memory 32. At this time, if a member ID was previously added to the electronic receipt data, the electronic receipt data is stored in the main memory 32 after the member ID has been deleted/removed. Then, if the search of the all receipt database 332 has ended, the processor 31 determines YES in ACT35 and proceeds to ACT36. The processor 31 controls the second communication interface 35 to transmit all the electronic receipt data stored in the main memory 32 to the center server 5 that has transmitted the all receipt request command, as ACT36. With this control, the electronic receipt data is transmitted from the second communication interface 35 to the center server 5 via the communication network 4. At this time, the electronic receipt data is converted into, for example, a CSV (comma separated value) format and transmitted to the center server 5. Therefore, the client terminal 7 connected to the center server 5 can acquire the receipt data that satisfies the designated condition, and thud can browse or process the receipt data.

As described above, according to the first embodiment, it is possible to provide an electronic receipt server 3 that can easily manage receipt data issued not only for customers who are receiving an electronic receipt service but also for other customers who are not receiving the electronic receipt service.

According to the first embodiment, the acquisition program P1 is installed in the POS terminal 1 installed in each store, and the processing terminal 2 in which the generation program P2 is installed is connected to the POS terminal 1. Then, by connecting the processing terminal 2 to the electronic receipt server 3 via the communication network 4, a data management system that achieves the above-described operational effects is configured. Therefore, even in a shopping center in which each store has introduced its own POP (Point of Purchase) system, it is possible to install a data management system that can achieve the above-described effects at a relatively low cost by modifications to the existing system. Moreover, it does not matter whether or not the manufacturers of the POS systems installed in each store are different.

Second Embodiment

Next, a second embodiment will be described. In the first embodiment, the electronic receipt server 3 manages data of receipts issued by a plurality of tenant stores in one shopping center. An electronic receipt server 30 in the second embodiment manages data of receipts issued at a number of tenant stores in a plurality of shopping centers operated by different developers. In the second embodiment, the number of shopping centers is two for convenience of explanation, but this is not a limit.

Figure 8:
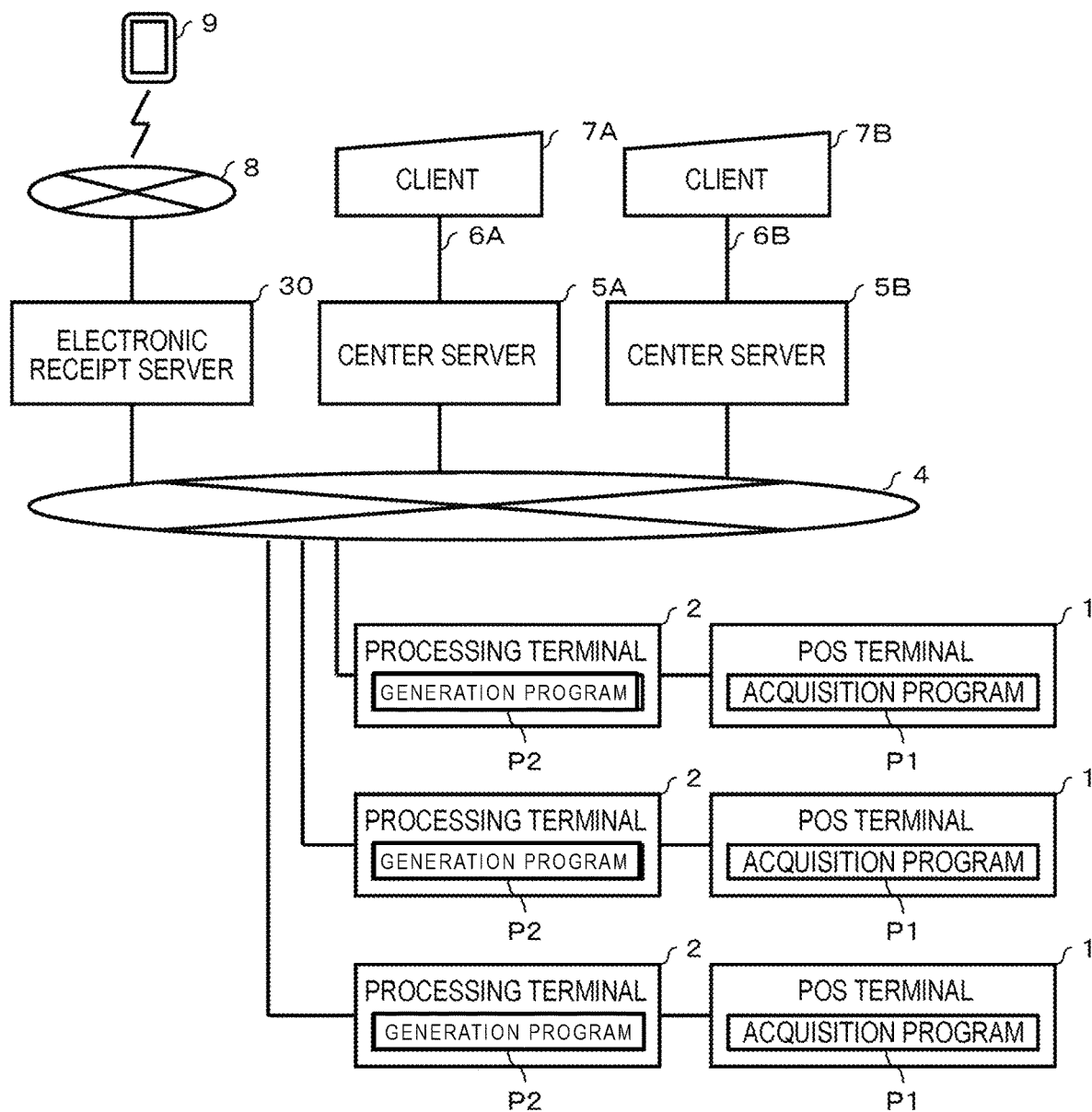
FIG. 8 depicts aspects of a data management system according to a second embodiment.

FIG. 8 is a configuration diagram of an entire system including a data management system according to the second embodiment. In FIG. 8, components common to FIG. 1 showing the data management system of the first embodiment are denoted by the same reference numerals, and the detailed description thereof will be omitted.

In the second embodiment, the data management system includes a plurality of processing terminals 2 respectively connected to a plurality of POS terminals 1, an electronic receipt server 30, and the communication network 4. The communication network 4 is connected to two center servers 5A and 5B. One center server 5A is a computer managed by one developer of a first shopping center A. A client terminal 7A is connected to the center server 5A via a communication line 6A. The other center server 5B is a computer managed by the other developer of a second shopping center B. A client terminal 7B is connected to the center server 5B via a communication line 6B.

The POS terminal 1 and the processing terminal 2 are installed in each store operating in the shopping center A or the shopping center B as a tenant. The POS terminal 1 and the processing terminal 2 are connected by a communication line conforming to, for example, the RS232C interface standard. The communication line may be wired or wireless. The POS terminal 1 and the processing terminal 2 are as described in the first embodiment. Therefore, further descriptions are omitted.

Figure 9:
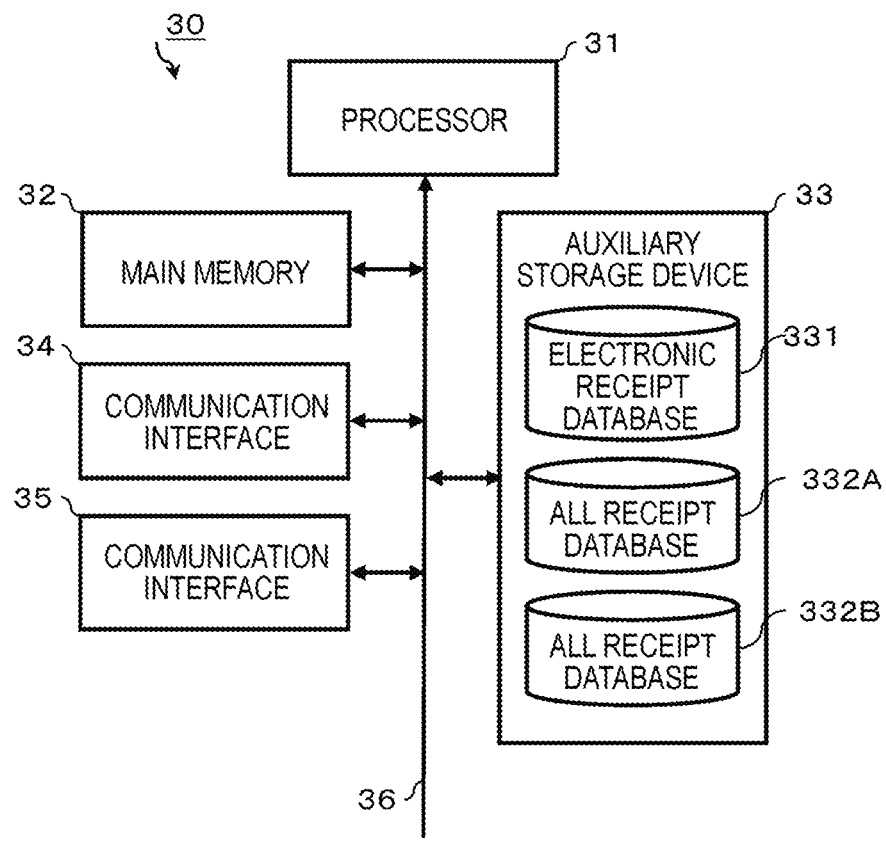
FIG. 9 is a block diagram of an electronic receipt server included in a data management system according to the second embodiment.

FIG. 9 is a block diagram of the electronic receipt server 30 in the second embodiment. As is clear from the comparison between FIG. 9 and FIG. 3, the difference between the electronic receipt server 30 of the second embodiment and the electronic receipt server 3 of the first embodiment is the number of the all receipt database 332. That is, in the second embodiment, the all receipt database 332 stored in the auxiliary storage device 33 is divided into a first all receipt database 332A and a second all receipt database 332B. The first all receipt database 332A is the all receipt database 332 corresponding to the shopping center A. The second all receipt database 332B is the all receipt database 332 corresponding to the shopping center B.

Figure 10:
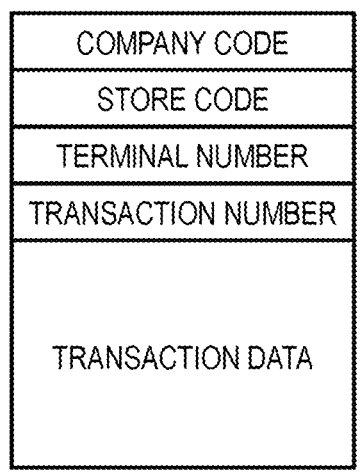
FIG. 10 is a schematic diagram showing a configuration example of receipt data.

FIG. 10 is a schematic diagram showing a data structure of a receipt issued from each store which is a tenant of either the shopping center A or the shopping center B. As shown in FIG. 10, the receipt has a data structure including a company code, a store code, a terminal number, and a transaction number in addition to transaction data such as a commodity name, a price, and a total price of each of one or more commodities registered in one transaction. The company code is a unique code for identifying the developer. The store code is a unique code for identifying the store. The terminal number is a unique code for identifying the POS terminal 1. The transaction number is a serial number issued each time a transaction is processed by the POS terminal 1 identified by the terminal number. Therefore, transaction data can be specified as unique data by a combination of a company code, a store code, a terminal number, and a transaction number.

Figure 11:
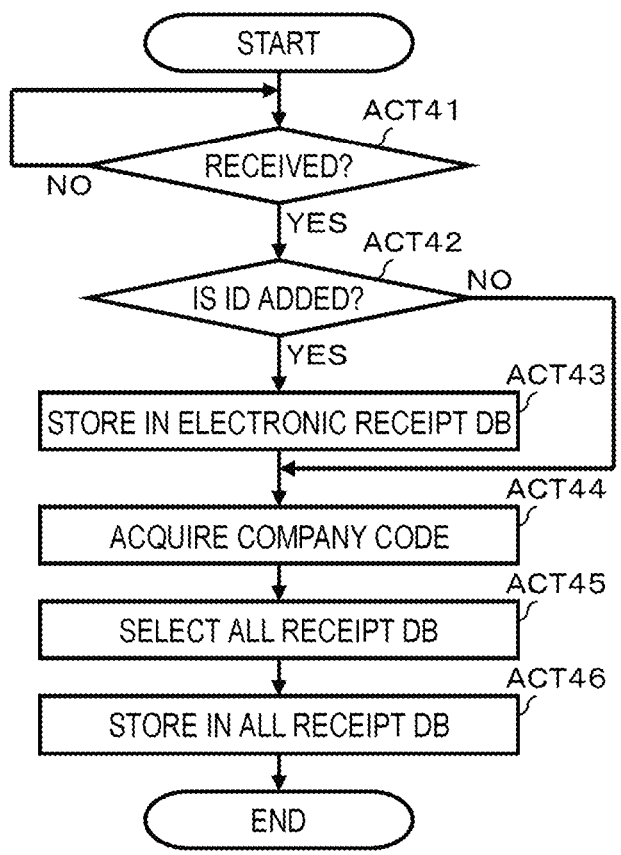
FIG. 11 is a flowchart of an electronic receipt data receiving process executed by an electronic receipt server according to the second embodiment.

FIG. 11 is a flowchart of a receipt data receiving process executed by the processor 31 of the electronic receipt server 30 according to the data management program. As shown in FIG. 11, the processor 31 of the electronic receipt server 30 is waiting for the electronic receipt data, as ACT41. When the electronic receipt data transmitted from any of the processing terminals 2 is received via the second communication interface 35, the processor 31 determines YES in ACT41 and proceeds to ACT42. The processor 31 checks whether or not a member ID is added to the electronic receipt data, as ACT42. If a member ID is added, the processor 31 determines YES in ACT42 and proceeds to ACT43. The processor 31 stores the electronic receipt data to which the member ID is added in the electronic receipt database 331, as ACT43. Thereafter, the processor 31 proceeds to ACT44.

On the other hand, if a member ID is not added to the electronic receipt data, the processor 31 determines NO in ACT42 and skips the process of ACT43. That is, the processor 31 does not store the electronic receipt data to which no member ID is added in the electronic receipt database 331. The processor 31 proceeds to ACT44.

The processor 31 acquires the company code from the electronic receipt data to which a member ID is added or the electronic receipt data to which no member ID is added, as ACT44. Then, the processor 31 selects one of the all receipt databases 332A and 332B corresponding to the shopping center operated by the developer identified by the company code. That is, if the company code is the code of the developer who operates the shopping center A, the processor 31 selects the first all receipt database 332A. If the company code is that of the developer of the shopping center B, the processor 31 selects the second all receipt database 332B.

When the processor 31 selects the first all receipt database 332A or the second all receipt database 332B, the processor 31 proceeds to ACT46. As ACT46, the processor 31 stores the electronic receipt data to which a member ID is added or the electronic receipt data to which no member ID is added in the first all receipt database 332A or the second all receipt database 332B selected in the process of ACT45. As described above, the processor 31 ends the information processing when receiving the electronic receipt data.

Figure 12:
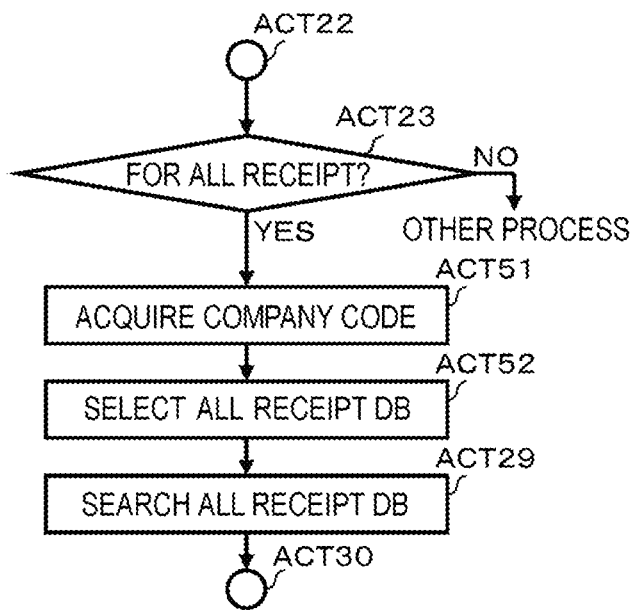
FIG. 12 is a flowchart of a request command receiving process executed by an electronic receipt server according to the second embodiment.

FIG. 12 is a flowchart showing a part of a request command receiving process executed by the processor 31 of the electronic receipt server 30 according to the data management program, which is different from the first embodiment. That is, FIG. 12 shows the process after the request command is the all receipt request command and YES is determined in ACT23. If YES is determined in ACT23, the processor 31 proceeds to ACT51. The processor 31 acquires a company code from all receipt request commands.

As described in the first embodiment, the all receipt request command is output from the center server 5. That is, in the second embodiment, the center server 5A outputs an all receipt request command together with a company code for identifying the developer of the shopping center A. From the center server 5B, an all receipt request command is output together with a company code for identifying the developer of the shopping center B.

The processor 31 that acquired the company code from the all receipt request command proceeds to ACT52. The processor 31 selects one of the all receipt databases 332A and 332B corresponding to the shopping center operated by the developer identified by the company code, as ACT52. That is, if the company code is the code of the developer who operates the shopping center A, the processor 31 selects the first all receipt database 332A. If the company code is the code of the developer of the shopping center B, the processor 31 selects the second all receipt database 332B.

When the processor 31 selects the first all receipt database 332A or the second all receipt database 332B, the processor 31 proceeds to ACT29. The processor 31 searches the selected first all receipt database 332A or second all receipt database 332B, as ACT29. The processor 31 checks whether or not the electronic receipt data stored in the first all receipt database 332A or the second all receipt database 332B satisfies the condition data included in the all receipt request command, as ACT30. Subsequent processing procedures are the same as in the first embodiment.

According to the second embodiment, for each shopping center A or shopping center B operated by a different developer, it is possible to provide the electronic receipt server 30 that can easily manage receipt data issued not only for customers who are receiving an electronic receipt service but also for other customers who are not receiving the electronic receipt service.

In the second embodiment, the number of shopping centers is two. When the number of shopping centers is three or more, the electronic receipt server 30 can manage the all receipt database 332 divided into three or more databases. Thus, the same effect can be achieved for additional shopping centers and/or developers. If the same developer operates a plurality of shopping centers, the same effect can be achieved by dividing all the receipt databases 332 by developer and managing the databases by the electronic receipt server 30 accordingly.

Third Embodiment

Next, a third embodiment will be described. The overall configuration of the data management system according to the third embodiment is the same as that of the first embodiment shown in FIG. 1. The configuration of the second embodiment shown in FIG. 8 can also be applied to the third embodiment.

Figure 13:
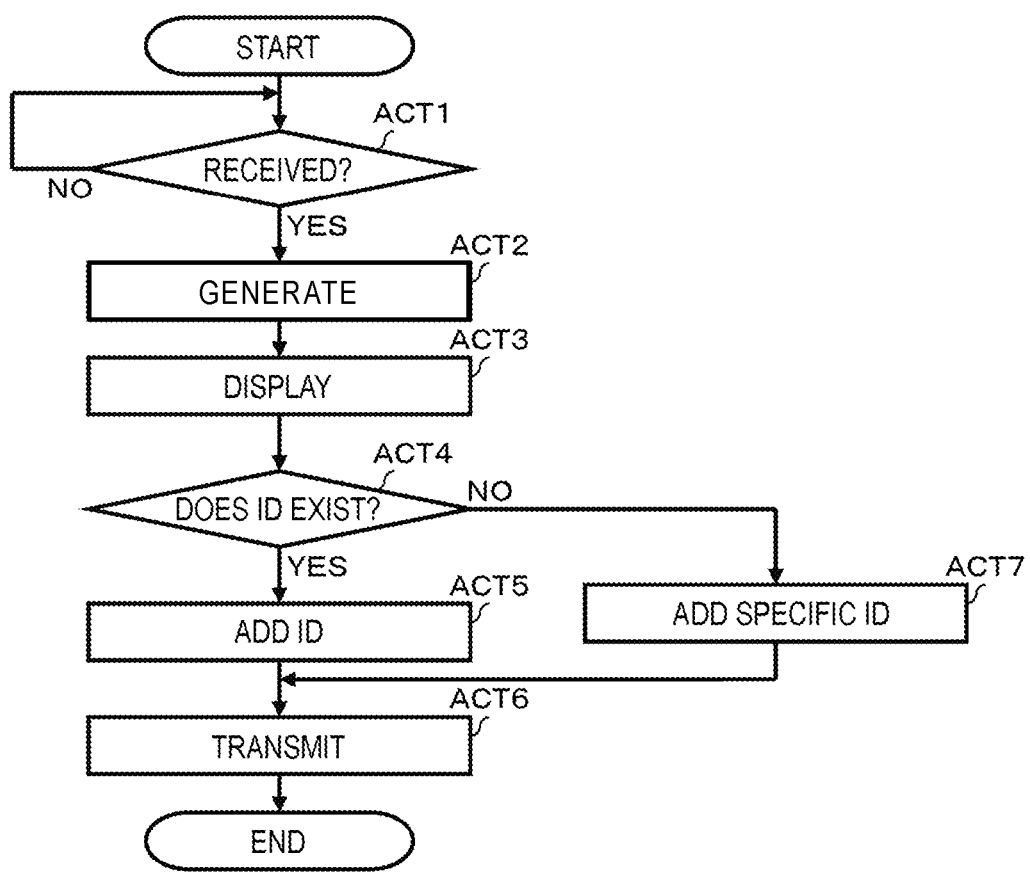
FIG. 13 is a flowchart of main information processing executed by a processing terminal in a third embodiment.

FIG. 13 is a flowchart showing a main information process executed by the processor 21 according to the control program in the third embodiment. In FIG. 13, processing ACTS in common with those described for the first embodiment in conjunction with FIG. 4 are denoted by the same reference numerals as used in FIG. 4.

As shown in FIG. 13, in the third embodiment, the processor 21 executes the same processes as in the first embodiment from ACT1 to ACT4. That is, the processor 21 checks whether or not a member ID for an electronic receipt member has been input, as ACT4. When the member ID is read via the reader 27, the processor 21 determines YES in ACT4, and proceeds to ACT5. The processor 21 adds the member ID to the electronic receipt data generated in the process of ACT2, as ACT5. Then, the processor 21 proceeds to the process of ACT6. On the other hand, if the signal from the touch panel 26 confirms that the "No" button BT2 has been touched, the processor 21 determines NO in ACT4 and proceeds to ACT7. The processor 21 adds a specific ID (e.g., a generic member ID) to the electronic receipt data generated in the process of ACT2, as ACT7. Then, the processor 21 proceeds to the process of ACT6.

The processor 21 controls the second communication interface 25 to transmit the electronic receipt data to the electronic receipt server 3, as ACT6. With this control, the electronic receipt data is transmitted to the electronic receipt server 3 via the communication network 4. Therefore, when the "Yes" button BT1 on the screen SC1 is touched and the member ID is then read by the reader 27, the electronic receipt data to which the member ID has been added is transmitted to the electronic receipt server 3. When the "No" button BT2 on the screen SC1 is touched, the electronic receipt data to which a specific ID has been added is transmitted to the electronic receipt server 3.

Here, the specific ID is a code generated with a combination of numbers, characters, or symbols that have the same number of digits/format as a member ID issued to an electronic receipt member but the specific ID is not matched to any particular person/member of the electronic receipt service/program. For example, if a member ID format has 10 digits, the specific ID code can be set to "999999999".

Figure 14:
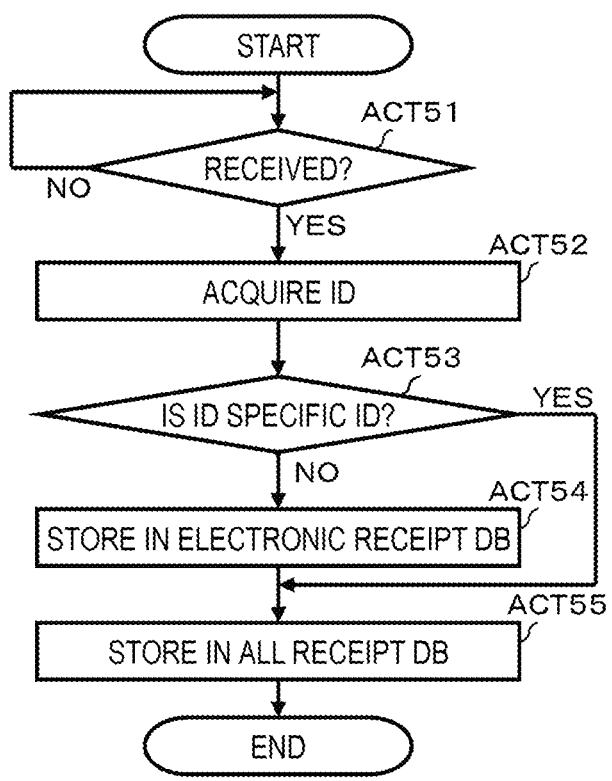
FIG. 14 is a flowchart of an electronic receipt data receiving process executed by an electronic receipt server in the third embodiment.

FIG. 14 is a flowchart showing a receipt data receiving process executed by the processor 31 of the electronic receipt server 30 according to the data management program in the third embodiment. As shown in FIG. 14, the processor 31 of the electronic receipt server 30 is waiting for the electronic receipt data, as ACT51. When the electronic receipt data transmitted from any of the processing terminals 2 is received via the second communication interface 35, the processor 31 determines YES in ACT51, and proceeds to ACT52. The processor 31 acquires the member ID added to the electronic receipt data, as ACT52. Then, the processor 31 checks whether or not the member ID is the specific ID code described above, as ACT53.

If the member ID added to the electronic receipt data is not the specific ID, the processor 31 determines NO in ACT53 and proceeds to ACT54. The processor 31 stores the electronic receipt data to which an actual member ID has been added in the electronic receipt database 331, as ACT54. Thereafter, the processor 31 proceeds to ACT55.

On the other hand, if a specific ID code has been added to the electronic receipt data as a placeholder/stand-in for a member ID, the processor 31 determines YES in ACT53 and skips the process in ACT54. That is, the processor 31 does not store the electronic receipt data to which the specific ID was added in the electronic receipt database 331. The processor 31 proceeds to ACT55.

The processor 31 stores electronic receipt data to which a member ID was added and electronic receipt data to which the specific ID was added in the all receipt database 332, as ACT55. As described above, the processor 31 ends the information processing when the electronic receipt data is received.

The third embodiment can provide the same operational effects as the first embodiment. In addition, according to the third embodiment, there is an advantage that the format of electronic receipt data transmitted from the processing terminal 2 to the electronic receipt server 3 can be unified.

As described above, the first to third embodiments have been described as the embodiments related to the data management system that can manage the data of the receipts issued at a plurality of stores, but such embodiments are not limited thereto.

For example, in the embodiment, the acquisition program P1 is installed in the POS terminal 1, and the processing terminal 2 in which the generation program P2 is installed is connected to the POS terminal 1. As another embodiment, the generation program P2 is installed together with the acquisition program P1 in the POS terminal 1, and a device corresponding to the reader 27 of the processing terminal 2 is connected to the POS terminal 1, so that the POS terminal 1 may function as the processing terminal 2. By doing so, the processing terminal 2 is no longer necessary, so that it is not necessary to consider the installation location of the processing terminal 2 in each store.

For example, in the first embodiment, the processor 31 of the electronic receipt server 3 executes the process of ACT12 after determining YES in ACT11 of FIG. 4. In this regard, the processor 31 first executes the process of ACT14 after determining YES in ACT11 of FIG. 4. After that, the processor 31 may execute the process of ACT12, and may execute the process of ACT13 when the member ID is added to the electronic receipt data.

For example, in the first embodiment, the processor 31 of the electronic receipt server 3 checks whether or not the received command is an electronic receipt request command, as ACT22 in FIG. 7, and checks whether or not the received command is an all receipt request command if the received command is not an electronic receipt request command. In some other examples, it may be first checked whether or not the received command is an all receipt request command, and then checked whether or not the received command is an electronic receipt request command.

In addition, the processor 31 of the above examples was explained as deleting the member ID as ACT33 and then storing, as ACT34, the electronic receipt data in the receipt memory if a member ID was added to the electronic receipt data in ACT32 of FIG. 7. However, in some other examples, the processor 31 may omit the processes of ACT32 and ACT33 and stores the electronic receipt data in the receipt memory regardless of whether or not a member ID was added. If the search of the all receipt database 332 is ended as ACT35, the processor 31 may delete the member ID from the electronic receipt data stored in the receipt memory in a lump or batch process and transmit the electronic receipt data to the center server 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic receipt data management system, comprising:
    a point of sales (POS) terminal installed at a store and configured to:
        perform checkout processing on one or more commodities purchased by a customer in a sales transaction,
        print a receipt of the sales transaction, and
        generate unstructured data of the printed receipt;
    an electronic receipt generating terminal installed at the store and including a first processor configured to:
        convert the unstructured data generated by the POS terminal into structured receipt data, when an electronic receipt user identifier of the customer is input in the sales transaction, include the user identifier in the structured receipt data, and issue the structured receipt data; and an electronic receipt management server including:
a network interface,
a memory that stores first and second databases for storing structured receipt data, and
a second processor configured to:
upon receiving structured receipt data from the electronic receipt generating terminal via the network interface, determine whether an electronic receipt user identifier is included in the structured receipt data,
upon determining that the user identifier is included in the structured receipt data, store the structured receipt data in the first and second databases,
upon determining that the user identifier is not included in the structured receipt data, store the structured receipt data in the second database,
upon receiving a request for structured receipt data from a customer terminal of a customer, search the first database for structured receipt data including an electronic receipt user identifier of the customer and control the network interface to transmit the structured receipt data found by the search to the customer terminal, and
upon receiving a request for structured receipt data with a search condition from a first center server operated by an entity other than the customer, search the second database for structured receipt data that satisfies the search condition and control the network interface to transmit the structured receipt data found by the search to the first center server.

2. The system according to claim 1, wherein the first processor is further configured to, when the user identifier is not input in the sales transaction, include a predetermined identifier in the structured receipt data, the predetermined identifier indicating the customer is not a participant in an electronic receipt service.

3. The system according to claim 1, wherein
the memory further stores a third database for storing structured receipt data, and
the second processor is further configured to, upon determining that the user identifier is not included in the structured receipt data, store the structured receipt data in either the second database or the third database depending on codes included in the structured receipt data.

4. The system according to claim 3, wherein each of the codes is associated with one of the entity that operates a shopping center including the store and another entity that operates a second center server.

5. The system according to claim 4, wherein the second processor is further configured to, upon receiving a request for structured receipt data from the second center server with a search condition, search the third database for structured receipt data that satisfies the search condition, and control the network interface to transmit the structured receipt data found by the search to the second center server.

6. The system according to claim 1, wherein the request from the customer terminal and the request from the first center server are transmitted via different networks.

7. The system according to claim 6, wherein the structured receipt data from the electronic receipt generating terminal and the request from the first center server are transmitted via a same network.

8. An electronic receipt data management method carried out by an electronic receipt data management system including a point of sales (POS) terminal and an electronic receipt generating terminal installed at a store and an electronic receipt management server, the method comprising:
by the POS terminal, performing checkout processing on one or more commodities purchased by a customer in a sales transaction, printing a receipt of the sales transaction, and generating unstructured data of the printed receipt;
by the electronic receipt generating terminal, converting the unstructured data into structured receipt data, when an electronic receipt user identifier of the customer is input in the sales transaction, including the user identifier in the structured receipt data, and issuing the structured receipt data; and
by the electronic receipt management server:
storing first and second databases for storing structured receipt data;
upon receiving structured receipt data, determining whether an electronic receipt user identifier is included in the structured receipt data;
upon determining that the user identifier is included in the structured receipt data, storing the structured receipt data in the first database and the second database; and
upon determining that the user identifier is not included in the structured receipt data, storing the structured receipt data in the second database;
upon receiving a request for structured receipt data from a customer terminal of a customer, searching the first database for structured receipt data including an electronic receipt user identifier of the customer and transmitting to the structured receipt data found by the search to the customer terminal; and
upon receiving a request for structured receipt data with a search condition from a first center server operated by an entity other than the customer, searching the second database for structured receipt data that satisfies the search condition and transmitting the structured receipt data found by the search to the first center server.

9. The method according to claim 8, further comprising:
by the electronic receipt generating terminal, when the user identifier is not input in the sales transaction, including a predetermined identifier in the structured receipt data, the predetermined identifier indicating the customer is not a participant in an electronic receipt service.

10. The method according to claim 8, further comprising:
by the electronic receipt management server, storing a third database for storing structured receipt data, and upon determining that the user identifier is not included in the structured receipt data, storing the structured receipt data in either the second database or the third database depending on codes included in the structured receipt data.

11. The method according to claim 10, wherein each of the codes is associated with one of the entity that operates a shopping center including the store and another entity that operates a second center server.

12. The method according to claim 11, further comprising:

by the electronic receipt management server, upon receiving a request for structured receipt data from the second center server with a search condition, searching the third database for structured receipt data that satisfies the search condition, and transmitting the structured receipt data found by the search to the second center server.

13. The method according to claim 8, wherein the request from the customer terminal and the request from the first center server are transmitted via different networks.

14. The method according to claim 13, wherein the structured receipt data from the electronic receipt generating terminal and the request from the first center server are transmitted via a same network.

* * * * *